United States Patent [19]
Kelly et al.

[11] Patent Number: 5,204,400
[45] Date of Patent: Apr. 20, 1993

[54] POLY(BIPHENYL ETHER SULFONE)COMPOSITIONS

[75] Inventors: W. E. Kelly, Neshanic Station; S. R. Patel, Branchburg; M. Matzner, Edison, all of N.J.

[73] Assignee: Amoco Corporation, Chicago, Ill.

[21] Appl. No.: 542,744

[22] Filed: Jun. 22, 1990

[51] Int. Cl.$^5$ .................. C08K 3/38; C08L 27/12; C08L 81/06
[52] U.S. Cl. .................. 524/405; 524/520; 524/609; 525/535
[58] Field of Search .......... 524/405, 373, 520, 609; 525/425, 535; 528/125

[56] References Cited

U.S. PATENT DOCUMENTS

| | | | |
|---|---|---|---|
| 4,041,013 | 8/1977 | Anderson | 524/373 |
| 4,049,619 | 9/1977 | Anderson | 524/373 |
| 4,713,426 | 12/1987 | Harris et al. | 525/471 |
| 4,755,556 | 7/1988 | Harris et al. | 524/609 |
| 4,798,855 | 1/1989 | Lausberg et al. | 524/504 |
| 4,804,724 | 2/1989 | Harris et al. | 525/471 |
| 4,867,912 | 9/1989 | Heinz et al. | 528/125 |
| 4,879,354 | 11/1987 | Harris et al. | 525/425 |
| 4,942,216 | 6/1990 | Heinz et al. | 528/125 |
| 4,981,895 | 1/1991 | Buchert et al. | 524/405 |
| 5,084,526 | 1/1992 | Harris et al. | 525/425 |

FOREIGN PATENT DOCUMENTS 0364729 4/1990 European Pat. Off. ............ 524/405

Primary Examiner—Paul R. Michl
Assistant Examiner—Peter Szekely
Attorney, Agent, or Firm—William E. Murray; Stephen L. Hensley; Frank J. Sroka

[57] ABSTRACT

Flame retardant polyarylether compositions comprising a poly(biphenyl ether sulfone) and anhydrous zinc borate are disclosed. The preferred compositions of the invention are blends of a poly(biphenyl ether sulfone) with a poly(aryl ether ketone) containing anhydrous zinc borate and a fluorocarbon polymer, and optionally titanium dioxide. The preferred compositions exhibit improved heat release characteristics.

25 Claims, No Drawings

19
POLY(BIPHENYL ETHER SULFONE)COMPOSITIONS

FIELD OF THE INVENTION

This invention relates generally to thermoplastic polyaryl ether compositions which comprise at least one poly(biphenyl ether sulfone) and zinc borate. Optionally, the compositions can include a poly(aryl ether ketone) or a poly(aryl ether sulfone), a fluorocarbon polymer and/or titanium dioxide.

BACKGROUND OF THE INVENTION

Engineering thermoplastics are used extensively in many components of aircraft interiors, such as wall panels, overhead storage lockers, serving trays, seat backs, cabin partitions, and ducts. Engineering thermoplastics are economically fabricated into these components by extrusion, thermoforming, injection molding, and blow-molding techniques.

United States Government standards for the flame resistance of construction materials used for aircraft interiors are set out in the 1986 amendments to Part 25-Airworthiness Standards—Transport Category Airplanes of Title 14, Code of Federal Regulations (see 51 Federal Register 26206, July 21, 1986 and 51 Federal Register 28322, Aug. 7, 1986). The flammability standards are based on heat calorimetry tests developed at Ohio State University (hereinafter "OSU Tests") Such OSU Tests are described in the above-cited amendments to 14 CFR Part 25 and are incorporated herein by reference. These tests measure the two minute total heat release (in kilowatts minute per square meter of surface area, $KW.min/m^2$) as well as the maximum heat release rate (in kilowatts per square meter of surface area, $KW/m^2$) over the first five minutes for the material being tested, when burned under a specified set of conditions. The 1986 standards required engineering thermoplastics to have both of these heat release measurements under 100. The new 1990 compliance standards will allow a maximum of 65 for each of the two heat release measurements. Hence, a need exists to develop new thermoplastic compositions that will be able to meet these flammability standards, and yet display at the same time such other desirable features as toughness, chemical, solvent and cleaner resistance, and ease of fabrication into finished components.

Flame retarding additives such as triphenyl phosphate or aluminum trihydrate which generally possess low flammability have been mixed with engineering thermoplastics to reduce flammability of the thermoplastics. However, a blend of such a low flammability additive with high performance engineering thermoplastics often does not yield a useable flame-resistant composition. For example, the low flammability additive may not be compatible, i.e. miscible with the engineering thermoplastic, at additive concentrations necessary to achieve significant flame retardance, or the additive may not be stable at the processing temperatures of the engineering thermoplastic. Furthermore, low flammability additives which are compatible with a particular engineering thermoplastic often cannot effectively lower the flammability or heat release of the thermoplastic. If the effect on flammability is merely a reduction due to dilution, amounts of the low-flammability additive necessary to achieve a desired reduction in flammability can adversely affect the physical properties or processibility of the engineering thermoplastic.

Thermoplastic blends consisting of a poly(aryl ether sulfone) and a poly(aryl ether ketone), containing a filler and/or a reinforcing fiber, are known; see Saito et al., U.S. Pat. No. 4,804,697 and Itteman et al., European Patent Application No. 297,363. Phase behavior of such blends was studied by Wu et al., Angew. Makromol. Chem. 171, 119–130 (1989). Mixtures of poly(aryl ether sulfones), which contain biphenyl groups, with poly(aryl ether ketones) are disclosed in European Patent Application No. 254,455 and in Harris et al., U.S. Pat. Nos. 4,713,426 and 4,804,724. These disclosures do not address improvement of the flammability of blends of poly(aryl ether sulfones) with poly(aryl ether ketones).

Blends of fluorocarbon polymers with either a poly(aryl ether sulfone) or a poly(aryl ether ketone) are disclosed in Vary, U.S. Pat. No. 3,992,347; Attwood, U.S. Pat. No. 4,131,711; Vasta, U.S. Pat. No. 4,169,117; and Saito et al., U.S. Pat. No. 4,578,427. These disclosures are not directed to flame retardant blends of a poly(aryl ether ketone) and a poly(aryl ether sulfone). Mixtures of polyarylene polyethers with 0.1 to 30.0 weight percent vinylidene fluoride-hexafluoropropene copolymer were described by Barth, U.S. Pat. No. 3,400,065. Several types of poly(aryl ether sulfone) are disclosed as examples of the polyarylene polyethers used in Barth's mixture. Barth does not disclose flame retardant blends of a poly(aryl ether ketone) and poly(aryl ether sulfone). Mixtures containing a fluorocarbon polymer, e.g., polytetrafluoroethylene, perfluorinated poly(ethylene-propylene) copolymer, or poly(vinylidene fluoride), with a number of engineering polymers including poly(aryl ether sulfones), are disclosed in European Patent Application No. 106,764. Blends of poly(aryl ether ketones) with non-crystalline copolymers of tetrafluoroethylene are disclosed in Petersen, U.S. Pat. No. 4,777,214. Composite materials consisting of a mixture of poly(aryl ether sulfone), a fluorocarbon polymer, and carbon fibers or of a mixture of poly(aryl ether ketone), a fluorocarbon polymer, and potassium titanate fibers are disclosed as useful for moldings in Japanese Patents 88/065,227B and 89/029,379B). None of these references disclose poly(biphenylene ether sulfone compositions comprising zinc borate.

Rock et al., European Patent Application No. 307,670, describes mixtures of 10 weight percent of a perfluorocarbon polymer with each of a polysulfone or a polyether sulfone or a polyether ketone as having improved heat release characteristics. Rock also describes the use of the perfluorocarbon polymer, finely divided titanium dioxide or mixtures of perfluorocarbons and titanium dioxide to improve the flammability characteristics of blends of a polyetherimide with a polyetherimide-siloxane block copolymer. Rock ascribes the beneficial effect of the titanium dioxide on flame retardancy of these polyetherimide blends to interaction between the $TiO_2$ and the siloxane moiety of the block copolymer portion of the blend. Rock does not disclose flame retardant poly(biphenyl) ether sulfones) or flame retardant blends of a poly(biphenyl ether sulfone) with a poly(aryl ether ketone) or a poly(aryl ether sulfone).

U S. Patent Application, Ser. No. 07/504,779, filed Apr. 4, 1990, entitled "Flame Resistant Thermoplastic Compositions" is commonly assigned to Amoco Corporation. That application is directed to thermoplastic materials which comprise a poly(biphenyl ether sulfone), a fluorocarbon polymer and titanium dioxide. These materials are disclosed as optionally including a poly(aryl ether ketone) or a poly(aryl ether sulfone). The materials of the commonly assigned application exhibit improved heat release values.

Zinc borate has been used in various thermoplastic compositions. Cella, et al., U.S. Pat. No. 4,833,190 discloses use of hydrated zinc borate as a smoke suppressant and flame retardant in silicone containing compositions Anderson, U.S. Pat. No. 4,049,619 discloses a thermoplastic composition of a polysulfone, a flame retarding bis-phenoxy compound and an enhancing agent for the bis-phenoxy compound, which is disclosed as one of numerous metal oxides or other materials. Zinc borate is listed as one possible enhancing agent. Neither Anderson nor Cella discloses flame retardant poly(biphenyl ether sulfones) or flame retardant blends of a poly(biphenyl ether sulfone) with a poly (aryl ether ketone) or a poly(aryl ether sulfone).

Presently, three polysulfone engineering thermoplastics are commercially available: polysulfone, such as UDEL ® from Amoco Performance Products, Inc.; poly(aryl ether sulfones) which do not contain biphenyl groups, such as VICTREX ® from Imperial Chemical Industries; and poly(biphenyl ether sulfones), such as RADEL ® R from Amoco Performance Products, Inc. Of these, poly(biphenyl ether sulfones) are the most expensive due to the high cost of biphenol used to produce the polymer. However, the poly(biphenyl ether sulfones) have the highest use temperature of these three and exhibit enhanced compatibility with poly(aryl ether ketones) as disclosed in Harris, U.S. Pat. Nos. 4,713,426 and 4,804,724.

It is the general object of the invention to provide thermoplastic compositions having improved heat release properties, particularly compositions based on poly(biphenyl ether sulfones). It is a specific object to provide thermoplastic compositions having improved flammability performance in aircraft interior parts, including improved resistance to flammability according to the OSU Test. It is another specific object to provide such compositions which are readily processable in both injection molding and sheet extrusion. It is another specific object to provide such compositions having excellent chemical and solvent resistance. Other objects will appear below.

It was unexpectedly discovered that the objects of the invention could be attained by compositions comprising a polyarylether comprising at least one poly(biphenyl ether sulfone) and zinc borate. The compositions can also contain other polyarylethers, including such compositions which further comprise a poly(aryl ether ketone) or a poly(aryl ether sulfone) or additives such as a fluorocarbon polymer and/or titanium dioxide. The compositions of the invention display an unexpected combination of excellent mechanical properties, superior chemical resistance, and very low flammability. Moreover, they are easy to melt-fabricate and yield molded articles having smooth and aesthetically pleasing surface characteristics. The instant compositions are useful in a number of applications, in particular for the construction of various panels and parts for aircraft interiors. None of the above references disclose or suggest a combination of a poly(biphenyl ether sulfone) and zinc borate.

SUMMARY OF THE INVENTION

The invention is directed to thermoplastic compositions having improved heat release properties comprising (a) a polyarylether comprising at least one poly(biphenyl ether sulfone) and (b) zinc borate. The amount of zinc borate incorporated in the compositions of the invention is an amount sufficient to reduce the heat release from the compositions, compared to the neat materials without zinc borate. Preferably, this amount is about 2.0 to about 8.0 parts by weight per 100 parts by weight polyarylether in the compositions. Optionally, other polyarylethers such as, for example, a poly(aryl ether ketone) or a poly(aryl ether sulfone) which does not contain a biphenyl group in its polymeric chain, can be included in the compositions. It is also possible to incorporate other additives, such as a fluorocarbon polymer into the compositions for further improvement of the heat release characteristics of the compositions. (The heat release characteristics or properties of thermoplastics, for purposes herein, are as determined by OSU Tests.)

The compositions of the invention display a unique combination of properties. These are:

1. Improved heat release characteristics as determined by OSU Tests, compared to the neat polymers. The preferred compositions of the invention show superior heat release performance;

2. Toughness and mechanical processability. The unscratched impact values of the inventive compositions, as determined by the procedures of ASTM D3029-84 and Boeing Airplane Co. Specification BBS 7271 are equal to or greater than 80 inch-lb. The compositions are also readily melt fabricated to produce molded articles having aesthetically pleasing surfaces; and 3. Chemical resistance. As defined in Boeing Airplane Co. Specification BMS-8-321, Sect. 8.2., thermoplastic samples for aircraft interiors are tested by exposure, while under stress, to each of four solvents (toluene, methyl ethyl ketone (MEK), Jet Fuel A and Skydrol). A thermoplastic "fails" to meet this Boeing Specification if any of the following occurs upon exposure to any one of the four solvents: swelling, shrinking, cracking or breaking. The preferred compositions of the invention meet or surpass these requirements, as they do not swell, shrink, craze, crack, or break when exposed to these solvents under the Boeing test conditions.

DESCRIPTION OF THE PREFERRED EMBODIMENTS

The compositions of the invention comprise a polyarylether comprising at least one poly(biphenyl ether sulfone) mixed with zinc borate and, additionally, may include other polyarylethers such as a poly(aryl ether ketone) or a poly(aryl ether sulfone) which does not contain a biphenyl group. Poly(aryl ether sulfone) is used hereafter to refer to such polysulfones which do not contain biphenyl groups. These polysulfones without biphenyl groups are also called poly(phenylene ether sulfones). Applicants have found that the use of zinc borate in such thermoplastic compositions results in materials having improved flammability performance according to the government mandated OSU Test. The presence of zinc borate would be expected to degrade the mechanical properties of blends of amorphous poly(biphenyl ether sulfone) and crystalline poly(aryl ether ketone). Yet, as noted above and as the Examples below demonstrate, the preferred compositions of the invention are remarkably tough.

The compositions of the invention may also incorporate a fluorocarbon polymer to provide additional heat release improvement. In the preferred compositions of poly(biphenyl sulfone) and poly(aryl ether ketone), the fluorocarbon does not provide significant reductions in heat release compared to such compositions containing zinc borate. However, the fluorocarbon polymer included in the preferred compositions of the invention does provide some heat release improvement. The compositions may also incorporate TiO$_2$ for pigmentation. Although compositions of the invention without TiO$_2$ have excellent properties, the preferred compositions also include TiO$_2$ because TiO$_2$ permits adjusting color of the compositions for color matching to other aircraft interior colors.

The thermoplastic compositions of the invention comprising a blend of poly(biphenyl ether sulfone) with the poly(aryl ether sulfone) display excellent flammability and toughness performance and are relatively less expensive. The compositions of the invention consisting essentially of poly(biphenyl ether sulfone) have better solvent resistance than those comprising blends of the poly(aryl ether sulfone), but they are not as effective in flammability retarding and are currently more expensive because of the cost of biphenyl monomers. Although they are currently the most costly, the compositions of the invention comprising poly(biphenyl ether sulfone) and the poly(aryl ether ketone) are preferred, because of their better solvent resistance and excellent flammability performance.

The preferred compositions of the invention comprise:

(a) from about 50.0 to about 80.0 parts by weight of a poly(biphenyl ether sulfone);

(b) from about 20.0 to about 50.0 parts by weight of a poly(aryl ether ketone), wherein the amount of the poly(biphenyl ether sulfone) and the poly(aryl ether ketone) are each per 100 parts combined weight of the poly(biphenyl ether sulfone) and the poly(aryl ether ketone);

(c) from about 2.0 parts to about 8.0 parts by weight, per 100 parts combined weight of the poly(biphenyl ether sulfone) and the poly(aryl ether ketone), of zinc borate;

(d) from about 1.0 to about 8.0 parts by weight, per 100 parts combined weight of the poly(biphenyl ether sulfone) and poly(aryl ether ketone) of a fluorocarbon polymer; and (e) from about 3.0 to about 12.0 parts by weight, per 100 parts combined weight of the poly(aryl ether sulfone) and poly(aryl ether ketone) of titanium dioxide.

The Poly(Biphenyl Ether Sulfone) Component

The poly(biphenyl ether sulfones) which are suitable for use in the compositions of this invention contain at least one biphenyl unit in the structure. Such poly(biphenyl ether sulfones) contain the repeating unit:

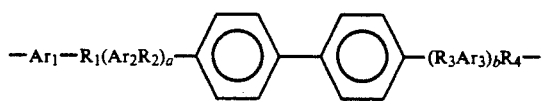

wherein R$_1$ through R$_4$ are —O—, —SO$_2$—, —S—, C=O, with the proviso that at least one of R$_1$ through R$_4$ is —SO$_2$—and at least one of R$_1$ through R$_4$ is —O—; Ar$_1$, Ar$_2$ and Ar$_3$ are arylene radicals containing 6 to 24 carbon atoms, and are preferably phenylene or biphenylene; and a and b are either 0 or 1.

In general, the higher the concentration of biphenyl or biphenylene groups, the better the properties of the polymer. In the formula above, preferably at least 50 mole percent, and more preferably at least 75 mole percent, of the arylene groups Ar$_1$,Ar$_2$, and Ar$_3$ are biphenylene groups such as p-biphenylene.

The poly(biphenyl ether sulfones) useful herein include those having one or more of the following recurring units:

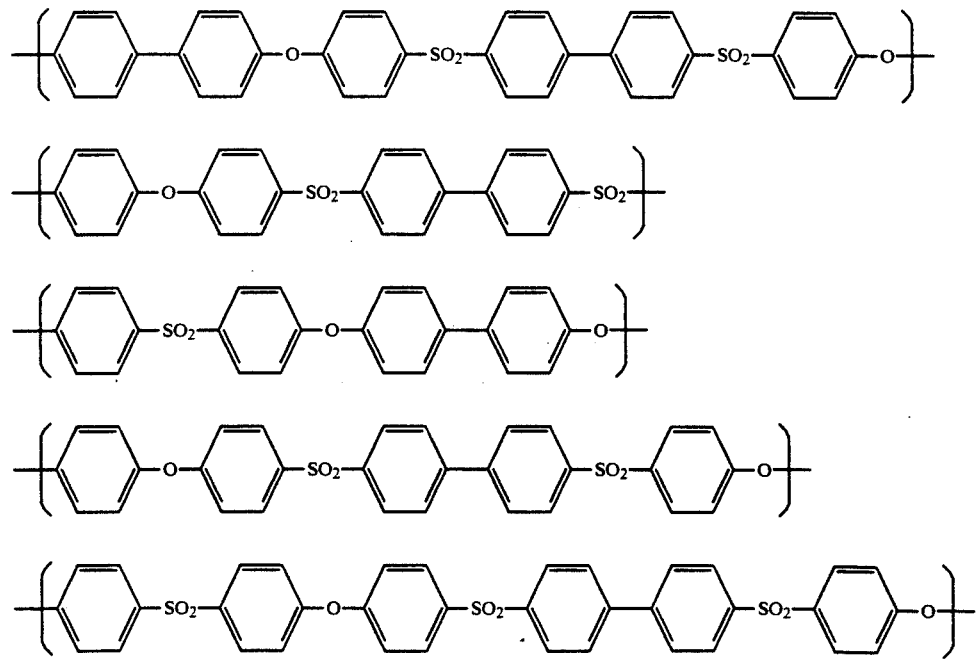

More preferably, the poly(biphenyl ether sulfone) comprises one or more repeating unit of:

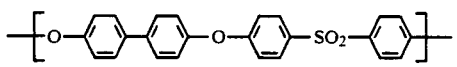

wherein at least 75 mole percent of the arylene groups present are p-biphenylene groups. Such a poly(biphenyl ether sulfone) is available as RADEL®R-5000 from Amoco Performance Products, Inc.

The poly(biphenyl ether sulfones) are produced by any suitable method such as those well known in the art and described in U.S. Pat. Nos. 3,634,355; 4,008,203; 4,108,837; and 4,175,175. It is preferred that the molecular weight of the poly(biphenyl ether sulfone) is such that its melt index (measured after 10 minutes residence time at 400° C. under a pressure of 44 psi) is in the range of from about 2 to about 12 grams/10 minutes. Use of a poly(biphenyl ether sulfone) having a melt index lower than 2 g/10 minutes results in compositions of lessened melt-fabricability; a poly(biphenyl ether sulfone) with a melt index above 12 g/10 minutes on the other hand, can result in compositions with marginal or unsatisfactory chemical resistance.

The amounts of the poly(biphenyl ether sulfone) component in the preferred compositions containing the poly(aryl ether ketone) is generally about 40.0 to about 80.0 parts by weight per 100 parts combined weight of the sulfone and the ketone components. Although still within the invention's scope, polysulfone/polyketone compositions with more than 80.0 parts of the poly(biphenyl ether sulfone) display lesser solvent resistance than the preferred compositions. Those with less than 40.0 parts of the sulfone display inadequate toughness and impact properties. More preferably, the poly(biphenyl ether sulfone) amount is about 50.0 parts by weight to about 80.0 parts by weight because compositions containing these amounts of the poly(biphenyl ether sulfone) have excellent solvent resistance and better impact resistance at a relatively lowest cost.

In compositions comprising a poly(aryl ether sulfone), the amount of the poly(biphenyl ether sulfone) is above about 50.0 parts by weight per 100 parts combined weight of the poly(aryl ether sulfone) and the poly(biphenyl ether sulfone). Compositions with the poly(aryl ether sulfone) have less effective solvent resistance than compositions consisting essentially of the poly(biphenyl ether sulfone) by itself, but at significantly lower cost. When the amount of the poly(biphenyl ether sulfone) is reduced below about 50.0 parts, the solvent resistance and impact resistance may become unacceptable for many applications.

The Poly(Aryl Ether Ketone) Component

The crystalline poly(aryl ether ketones) which are suitable for use herein contain a repeating unit of one or more of the following formulae:

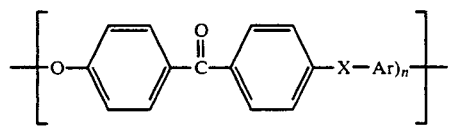 [I]

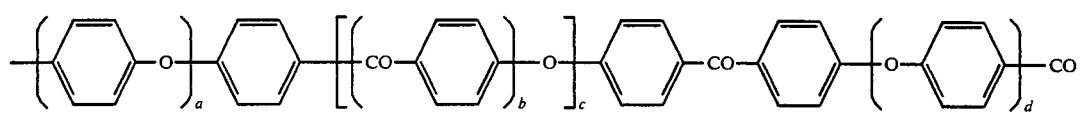 [II]

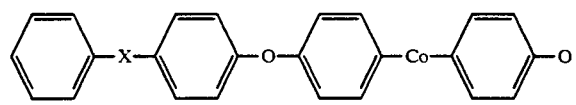 [III]

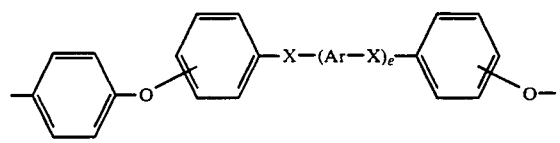 [IV]

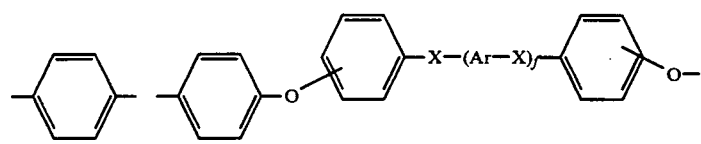 [V]

wherein Ar is independently a divalent aromatic radical selected from phenylene, biphenylene or naphthlylene, X is indpeendently O, C=O, or a direct bond; m is an integer of 0 to 3; b, c, d, and e are 0 or 1, and preferably d is 0 when b is 1; f is an integer of 1 to 4; and in formulas (IV) and (V) at least one X is C=O.

Examples of such poly(aryl ether ketones) includes those having a repeating unit of one or more of the formulae:

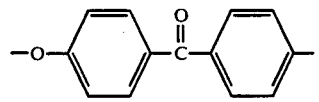

-continued
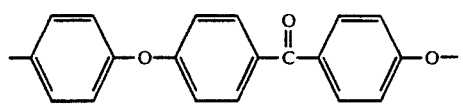
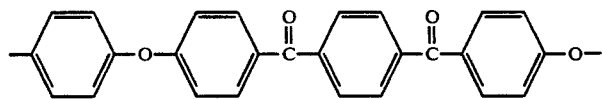
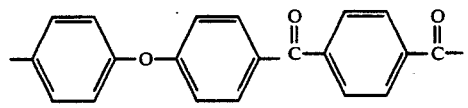
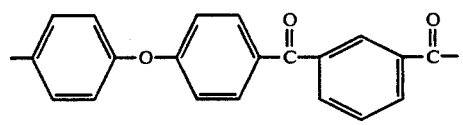
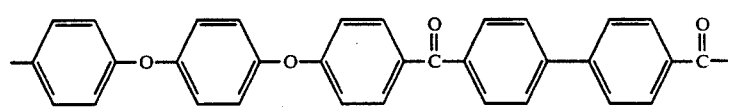
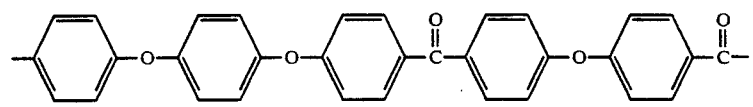
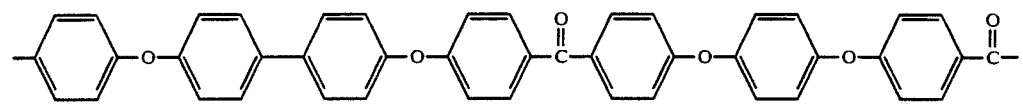
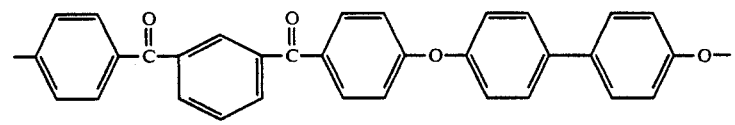
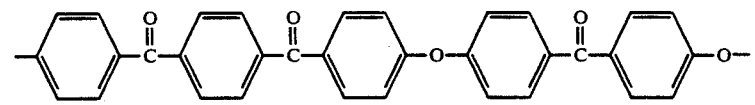
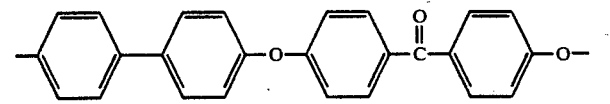
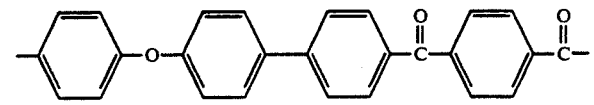
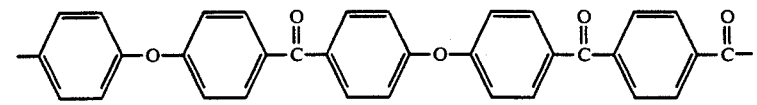

-continued

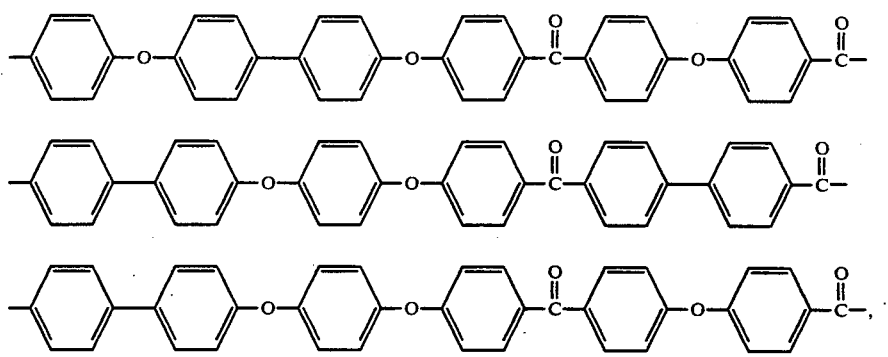

and poly(aryl ether ketones) comprising repeating units:

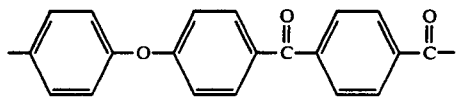

and

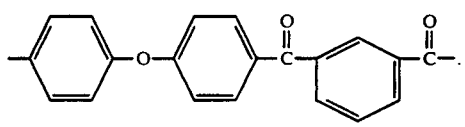

These poly(aryl ether ketones) are prepared by any suitable method such as those well known in the art. One such method comprises heating a substantially equimolar mixture of at least one bisphenol and at least one dihalobenzenoid compound or at least one halophenol compound as described in Canadian Patent No. 847,963. Preferred bisphenols used in such a process include:
hydroquinone,
4,4'-dihydroxybenzophenone,
4,4'-dihydroxybiphenyl, and
4,4'-dihydroxydiphenyl ether.
Preferred halo- and dihalobenzenoid compounds used in such a process include:
4-(4-chlorobenzoyl)phenol,
4,4'-difluorobenzophenone,
4,4'-dichlorobenzophenone,
4-chloro-4'-fluorobenzophenone,

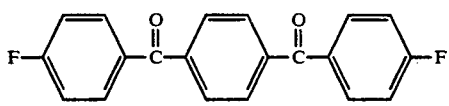

and

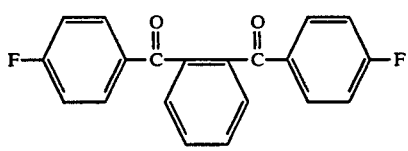

The poly(aryl ether ketones) may also be produced by the process as described in U.S. Pat. No. 4,176,222. This process comprises heating in the temperature range of 100° C. to 400° C. (1) a substantially equimolar mixture of (a) at least one bisphenol and (b) at least one dihalobenzenoid compound, and/or (2) at least one halophenol, in which in the dihalobenzenoid compound or halophenol the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.5 gram atoms of said alkali metal of higher atomic number per gram atom of sodium, the total amount of alkali metal carbonate or bicarbonate being such that there is at least one alkali metal atom for each phenol group present; and thereafter separating the polymer from the alkali metal halide.

Poly(aryl ether ketones) containing repeating units of the following formula:

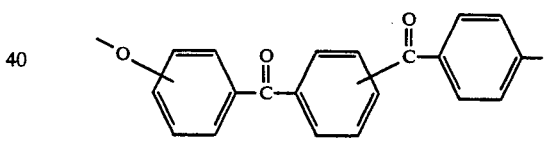

may be produced by Friedel-Crafts reactions utilizing hydrogen fluoride- boron trifluoride catalysts as described, for example, in U.S. Pat. No. 3,953,400.

Poly(aryl ether ketones) containing repeating units of the following formula:

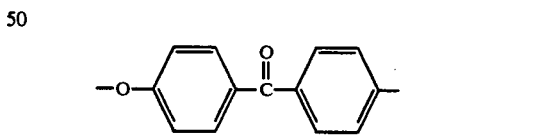

may be prepared by Friedel-Crafts reactions using a boron fluoride-hydrogen fluoride catalyst as described in, for example, U.S. Pat. Nos. 3,441,538; 3,442,857; and 3,516,966.

The poly(aryl ether ketones) may also be prepared according to the process as described in, for example, U.S. Defensive Publication T103,703 and U.S. Pat. No. 4,396,755. In this process, reactants such as (a) an aromatic monocarboxylic acid, or (b) a mixture of at least one aromatic dicarboxylic acid and of an aromatic compound, or (c) combinations of (a) and (b) are reacted in the presence of a fluoroalkane sulphonic acid, particularly trifluoromethane sulphonic acid.

Poly(aryl ether ketones) containing repeating units of the following formula:

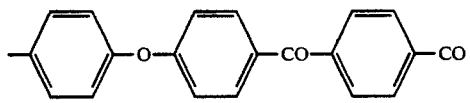

may be prepared according to the process as described in, for example, U.S. Pat. No. 4,398,020. In such a process, (a) a mixture of substantially equimolar amounts of (i) at least one aromatic diacyl halide of the formula

where —Ar$_4$— is a divalent aromatic radical, Y is halogen and COY is an aromatically bound acyl halide group, wherein the diacyl halide is polymerizable with at least one aromatic compound described in (a)(ii) below, and (ii) at least one aromatic compound of the formula

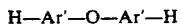

where —Ar'— is a divalent aromatic radical and H is an aromatically bound hydrogen atom, which compound is polymerizable with at least one diacyl halide described in (a)(i) above, or (b) at least one aromatic monoacyl halide of formula

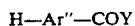

where —Ar"—is a divalent aromatic radical and H is an aromatically bound hydrogen atom, Y is halogen, and COY is an aromatically bound acyl halide group, which monoacyl halide is self-polymerizable, or (c) a combination of (a) and (b), is reacted in the presence of a fluoroalkane sulphonic acid.

The term poly(aryl ether ketone) as used herein is meant to include homopolymers, copolymers, terpolymers, block copolymers and graft copolymers. For example, any one or more of the repeating units (I) to (V) may be combined to form copolymers, etc.

The preferred poly(aryl ether ketone) for use in the preferred compositions of the invention has repeating units of the formula:

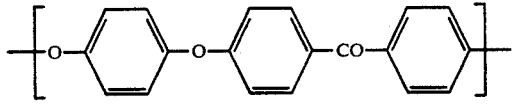

Such a poly(aryl ether ketone) is available commercially from Imperial Chemical Industries, Ltd. under the trademark VICTREX ® PEEK.

The poly(aryl ether ketones) have preferably reduced viscosities in the range of from about 0.8 to about 1.8 dl/g at measured in concentrated sulfuric acid at 25° C. and at atmosperhic pressure, to provide compositions having excellent processability. For injection molding applications, Applicants prefer to use a polyketone having a melt flow above 40 g./10 minutes at 400° C., such as VICTREX ®PEEK, grade 150P. For sheet applications, a polyketone having a melt flow of about 1.0 to about 8.0 g./10 minutes at 400° C., such as VICTREX ®PEEK, grade 450P, is preferred.

If used, the amount of the poly(aryl ether ketone) present in compositions of the invention can be any amount, but preferably is about 20.0 parts to about 60.0 parts by weight per 100 parts combined weight of the poly(aryl ether ketone) and poly(biphenyl ether sulfone). Blend compositions of poly(biphenyl ether sulfones) with less than 20.0 parts of the ketone display lesser solvent resistance, which is still acceptable for some applications, and those with more than 60.0 parts of the ketone display lesser impact properties. More preferably, the poly(aryl ether ketone) amount is about 20.0 parts to about 50.0 parts, since compositions with these amounts have an excellent combination properties.

As can be seen in the Examples below, melt indices of the compositions of the invention (measured after 10 minutes residence time at 380° C. under a pressure of 44 psi) are preferably from about 4.0 to about 15.0 g/10 minutes because excellent molding performance is obtained with compositions having melt indices in this range.

The Poly(Aryl Ether Sulfone) Component

Any suitable amorphous poly(aryl ether sulfone) can be used in the compositions of the invention. The poly(aryl ether sulfones) used do not contain a biphenyl group in their polymer chains, and have repeating units of the general formula:

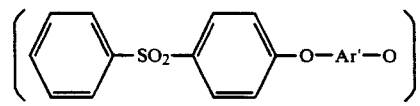

wherein Ar' is a phenylene moiety other than biphenyl, such as substituted or unsubstituted p-phenylene, bisphenol A moieties

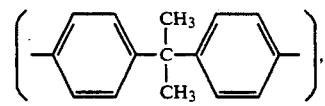

and bisphenol S moieties

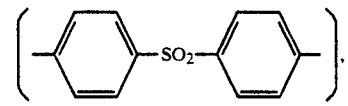

Preferably, at least 50 and more preferably, at least 75 mole percent of the divalent Ar' groups are bisphenol S moieties

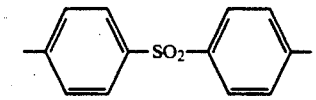

and the remainder (0 to 50 mole percent) p-phenylene.

For example, commercially available RADEL ®A-200 and UDEL ®, both available from Amoco Performance Products, Inc., and VICTREX ®PES, available from Imperial Chemical Industries, Ltd., can be used in mixture with the poly(biphenyl ether sulfone). RADEL ®A-200 is the condensation product of dichlorodiphenyl sulfone with a 3:1 molar ratio of Bisphenol S to hydroquinone. UDEL ® can be made via nucleophilic condensation of Bisphenol A di-sodium salt with dichlorodiphenyhl sulfone or by the alkali metal carbonate catalyzed reaction of Bisphenol A and dichlorodiphenylsulfone. VICTREX ® PES is made via polycondensation of 4,4'-dihydroxydiphenyl sulfone with 4,4'-dichlorophenyl sulfone. The melt index of the poly(aryl ether sulfone) is about 5 g/10 min. to about 45 g/10 min. (measured at 380° C. for 10 minutes residence time at 44 psi)

If used, the amount of poly(aryl ether sulfone) present in mixture with the poly(biphenyl ether sulfone) on a weight basis is in the range of about 10.0 parts to about 50.0 parts per 100 parts by weight combined total of the poly(aryl ether sulfone) and the poly(biphenyl ether sulfone). Amounts below this range give compositions with lesser properties.

The Zinc Borate Component

The zinc borate used is preferably anhydrous, having water amounts less than 0.2 wt.% of the zinc borate; hydrated zinc borate or zinc borates with greater water content can result in compositions which are difficult to process or, when molded, have unacceptable surface defects, such as splays and cracks. Any suitable anhydrous zinc borate may be used. Anhydrous zinc borate of the formula $2ZnO \cdot 3B_2O_3$, having no measurable water content and having a mean particle size of 11.8 microns, is available as XPI-187 from U.S. Borax and is produced by thermal dehydration of zinc borate at 500° C. The amount of zinc borate is an effective amount to achieve low heat release, and generally is about 2.0 to about 8.0 parts by weight per 100 parts by total weight of the poly(biphenyl ether sulfone) or the combined weight of the poly(biphenyl ether sulfone) with either the poly(aryl ether ketone) or the poly(aryl ether sulfone). Amounts of zinc borate above about 8.0 parts do not provide further flammability improvement over use of lesser zinc borate amounts, while amounts below 2.0 parts may not provide improvement in heat release. In the preferred compositions of the invention, about 3.0 to about 7.0 parts zinc borate are used. Any suitable particle size of the zinc borate can be used, preferably a small particle size to provide better heat release and solvent resistance.

The Fluorocarbon Polymer Component

The fluorocarbon polymers employed in the compositions of this invention are thermoplastic fluorinated polyolefins which have an essentially crystalline structure and have a melting point in excess of about 120° C. They are preferably a polymer of one or more perfluorinated unsaturated ethylenic monomers and, optionally, one or more other unsaturated ethylenic compounds. Suitable monomers include, for example, perfluorinated monoolefins, such as hexafluoropropylene or tetrafluoroethylene, and perfluoroalkyl vinyl ethers in which the alkyl group contains up to six carbon atoms, e.g., perfluoro (methyl vinyl ether). The monoolefin is preferably a straight or branched chain compound having a terminal double bond and containing less than six carbon atoms, and more preferably two or three carbon atoms. The fluorocarbon polymers also include those in which a portion of the fluorine atoms have been replaced by other halogen atoms, such as chlorine or bromine. Preferred fluorocarbon polymers include polytetrafluoroethylene, polychlorotrifluoroethylene, polybromotrifluoroethylene, and copolymers thereof. Other suitable fluorinated polyolefins include polyperfluorobutadiene, polyhexafluoropropylene, fluorinated ethylene propylene copolymer, and perfluoroalkoxy resin. A particularly preferred fluorinated polyethylene is polytetrafluoroethylene (referred to hereafter as "PTFE"because it is commercially available. Such polytetrafluoroethylenes are fully fluorinated polyethylenes of the basic chemical formula $(-CF_2-CF_2-)_s$ which contain about 78 percent by weight fluorine.

Relatively low molecular weight fluorocarbon polymers (also referred to as non-fibrillating polymers) are preferably used because of their performance; compositions containing higher molecular weight fluorocarbon polymers (also referred to as fibrillating polymers) can also be used. In general, the molecular weights of preferred fluorocarbon polymers are less than about 100,000. The optimal molecular weight may vary from one fluorocarbon polymer to another, and can be determined empirically. A suitable fluorocarbon polymer is a polytetrafluoroethylene, POLYMIST ®F5A available from Ausimont, Morristown, N.J.

The fluorocarbon polymers are employed preferably in the form of finely divided solids having a particle size of less than about 5.0 microns because such solids are more easily dispersed and result in better impact properties. The fluorocarbon polymers should be highly dispersed in the thermoplastic matrix to produce low flammability products. Dispersibility is related to the molecular weight and/or particle size of the fluorocarbon polymer. The uniformity of the dispersion of the fluorocarbon polymer may be determined by observing the physical appearance of the molded product or test specimen and by measuring the degree of elongation at break of the product. Low elongation values may indicate poor dispersion.

The fluorocarbon polymer is employed in amounts of about 1.0 part by weight to about 5.0 parts by weight based on 100 parts combined weight of the poly(biphenyl ether sulfone) and the poly(aryl ether ketone) or the poly(aryl ether sulfone) components. Concentrations of the fluorocarbon polymer above 5.0 parts by weight are undesirable since these amounts can adversely affect the compounding and moldability of the compositions and can create a perlescent effect, making color matching a problem.

The Optional Titanium Dioxide Component

The titanium dioxide used in the instant compositions is commercially available, and any suitable $TiO_2$ can be used. The particle size of the $TiO_2$ is preferably below 5.0 microns because higher particle sizes can deleteriously affect the physical properties of the compositions. Any of the available crystalline forms of the titanium dioxide may be used, with the rutile form preferred due to its superior pigment properties. Use of $TiO_2$ also provides increased ability for color matching for particular end uses, but $TiO_2$ should not be used for black colored applications.

The total amount of $TiO_2$ used is preferably below about 12.0 parts by weight per 100 parts by weight of the poly(biphenyl ether sulfone) or combined weight of the blend of poly(biphenyl ether sulfone), to avoid compounding and processing difficulties. Preferred compositions employ about 3.0 to about 7.0 parts by weight zinc borate, about 1.0 to about 4.0 parts fluorocarbon polymer and about 3.0 to about 7.0 parts by weight $TiO_2$, per 100 parts by weight of the poly(biphenyl ether sulfone) blend. These compositions are preferred because of color matching and flammability performance.

Compounding of the Compositions

Any suitable procedure can be used to compound the compositions of the invention, and the solid components can be mixed with each other in any desirable order. Applicants prefer to blend desirable amounts of the all solids present and then heat the resulting mixture to above the melting point of the highest melting polymer in the mixture. The molten mixture is then mixed for any suitable period to achieve thorough dispersion of the additive(s) and mixing of the polymers present, and then extruded and cooled into any desirable shape. Such a process can be conveniently carried out with commercial extruders such as supplied by Berstorff Tire Corporation. In the compositions of the invention which comprise $TiO_2$, it is not necessary to add the oxide initially. For example, the composition containing zinc borate can be compounded first, and desirable amounts of $TiO_2$ can be mixed in later.

The desired end use affects the choice among compositions of the invention. For example, when the compositions comprising poly(aryl ether ketone) will be extruded into sheet form having a thickness less than about 0.125 inches, higher amounts of the poly(biphenyl ether sulfone) are used because compositions containing less than 70.0 parts polysulfone displayed poorer heat release performance in sheet applications. Applicants prefer to use more than 70.0 parts, and more preferably about 75.0 parts of the poly (biphenyl ether sulfone) per 100 parts total weight polysulfone and polyketone for sheet applications. For injection molding applications, Applicants prefer to use compositions with less than 70.0 parts and more preferably about 65.0 parts by weight poly(biphenyl ether sulfone) per 100 parts total weight poly(biphenyl ether sulfone) and poly(aryl ether ketone). Compositions with more than 70.0 parts polysulfone may display lesser solvent performance in injection molding applications.

Other additives may be included in the compositions of this invention. These additives include plasticizers; pigments; anti-oxidants; reinforcing agents, such as glass fibers; thermal stabilizers; ultraviolet light stabilizers; impact modifiers; mold release agents and the like.

As indicated earlier, the blends of the present invention display excellent fabricability characteristics. They may be fabricated into any desired shape, i.e. moldings, films, fibers, and the like. They are particularly suited for the construction of various panels and parts for aircraft interiors, such as heating/cooling ducts, overhead compartments, shelving, tray tables, arm rests and the like.

EXAMPLES

The following examples illustrate the practice of this invention but they are not intended in any way to limit the scope of the invention.

The following designations are used in the examples and they have the following meaning:

PS—a biphenyl-containing poly(aryl ether sulfone) of the formula

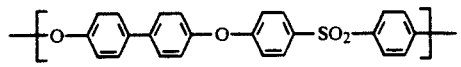

available commercially by Amoco Performance Products, Inc. under the trademark RADEL®R-5000 and having a melt flow of 3–8 gr./10 min.

PK—a poly(aryl ether ketone) of the formula

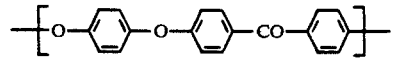

available commercially from Imperial Chemical Industries, Ltd. under the trademark VICTREX®PEEK, grades 150P or 450G, differing in molecular weights (melt viscosities at 400° C. are 0.11–0.19 $KNS/m^2$ 150P and 0.38–0.51 $KNS/m^2$ for 450G).

PAES—a poly(aryl ether sulfone) which is the condensation product of dichlorodiphenyl sulfone with a 3:1 molar ratio of Bisphenol S to hydroquinone, having a reduced viscosity of 0.46–0.50 as measured in N-methylpyrrolidone at a concentration of 0.2 g./dl. at 25° C., available as Radel®A-200, from Amoco Performance Products, Inc.

F5A—a polytetrafluoroethylene of low molecular weight (non-fibrillating), available from Ausimont, under the trademark POLYMIST F5A®.

T-60—A fibrillating, high molecular weight polytetrafluoroethylene available commercially from E. I. du Pont de Nemours and Co.

ZnB—anhydrous zinc borate, XPI-187 from U.S. Borax $TiO_2$—titanium dioxide. Commercially available pigment grade material was used.

Experimental Procedure

All materials were prepared by first dry blending the components using a mechanical blender (turned end over end). They were then compounded using a Berstorff ZE25, twenty-five mm co-rotating twin-screw extruder. The zone temperatures in the extruder were: Feed zone, 290°–300° C.; Zones 2 and 3, 340-365° C; Zones 4 and 5, 340-355° C; Zone 6,330°–355° C.; and Zone 7 (Die), 335°–355° C. The melt temperature ranged from 350° C. to 395° C. Screw speeds were 170 to 250 rpm and head pressure ranged from 180–700 psi; varying with the materials compounded.

Standard ASTM test specimens for each of the compounded materials were injection molded in 60,80 or 120 mils thicknesses on Battenfeld or Arburg injection molding machines having 3 ounce injection capacities. Molding conditions varied with the material, but generally were as follows:
Mold Temperature, 270° C–325° F.
Barrell Temperatures,
  Nozzle, 355°–385° C.
  Front, 350°–390° C.
  Center, 340°–365° C.
  Feed, 330°–350° C.
Melt Temperature, 360°–400° C.
Injection Speed, Moderate
Injection Pressure, 1200–2000 psi
Holding Pressure, 800–1500 psi
Back Pressure, 25–150 psi
Screw Speed, 100–160 rpm.

O.S.U. Heat release tests were performed as set out in 14 CFR, Part 25, Airworthiness Standards—Transport Category Airplanes. The heat release data ("Av. Max. Heat Release") is the maximum heat release for five minutes, is in $KW/m^2$ and is an average of three or five tests of the sample, rounded to the nearest tenth. The two-minute heat release data is not provided in these Examples because all Examples passed the 1990 two-minute standards with values below 10 KW.min/m². Impact strengths ("Ins") are in foot lbs. and the impact tests were performed as set out in Boeing Airline Company Specification BMS 7271.

EXAMPLES 1–22 AND COMPARATIVE EXAMPLES 1–6

Examples 1–22 are for compositions of the invention comprising a poly(biphenyl ether sulfone) and a poly(aryl ketone) and Comparative Examples 1–6 are for comparison to such blends.

Examples 1–19 and Comparative Examples 1–3 and 5 were all blends using 65 parts by weight PS and 35 parts by weight PK. Examples 20–22 and Comparative Example 4 were 75 parts PS and 25 parts PK. Comparative Example 5 was neat PS and Comparative Example 6 was neat PK. The amount of additives and test data are in Table 1.

TABLE 1

|       | F5A | ZnB | TiO2 | Av. Max. Heat Release | Impact |
|-------|-----|-----|------|-----------------------|--------|
| EX.   |     |     |      |                       |        |
| 1     | 0   | 4   | 0    | 54.0                  | 125.6  |
| 2     | 0   | 8   | 0    | 44.0                  | 106.4  |
| 3     | 0   | 15  | 0    | 46.0                  | 79.2   |
| 4     | 2   | 4   | 0    | 42.0                  | 109.6  |
| 5     | 2   | 8   | 0    | 35.0                  | 95.2   |
| 6     | 2   | 15  | 0    | 36.0                  | 78.4   |
| 7     | 0   | 4   | 0    | 42.0                  | 104.4  |
| 8     | 3   | 8   | 0    | 35.0                  | 111.2  |
| 9     | 6   | 4   | 0    | 39.0                  | 111.2  |
| 10    | 6   | 8   | 2.5  | 32.0                  | 141.6  |
| 11    | 2   | 4   | 0    | 33.0                  | 132    |
| 12    | 2   | 6   | 0    | 34.0                  | 114.4  |
| 13    | 2   | 6   | 2.5  | 34.0                  | 112.0  |
| 14    | 1   | 4   | 0    | 46.0                  | 125.6  |
| 15    | 2   | 4   | 0    | 47.0                  | 129.6  |
| 16    | 3   | 5   | 0    | 44.0                  | 128.8  |
| 17    | 3   | 7   | 0    | 56.0                  | 136.0  |
| 18    | 3   | 7   | 2.5  | 44.0                  | 138.4  |
| 19A   | 2   | 4   | 0    | 35.0                  | 74.4   |
| 19B   | 2   | 4   | 0    | 52.0                  | 125.6  |
| 19C   | 2   | 4   | 0    | 50.0                  | >160   |
| 20    | 0   | 5   | 4    | 43.6                  | 70.4   |
| 21    | 5.0 | 8   | 2.5  | 33.0                  | 59.2   |
| 22    | 0   | 4   | 0    | 49.0                  | 76.0   |
| Comp. Ex |  |     |      |                       |        |
| 1     | 3   | 0   | 0    | 41.0                  | >160   |
| 2     | 5   | 0   | 0    | 42.0                  | 128    |
| 3     | 2   | 0   | 4    | 49.0                  | >160   |
| 4     | 0   | 0   | 2.5  | 55.0                  | 119.2  |
| 5     | 0   | 0   | 0    | 91.0                  | —      |
| 6     | 0   | 0   | 0    | 80–140                | —      |

Examples 19A and 16–18 were 60 mils thick samples; Example 16C was 125 mils thick and all other Examples were 80 mils thick.

Examples 1–22 are of compositions of the invention comprising a poly(biphenyl ether sulfone) and a poly(aryl) ether ketone). Applicants' experience is that the OSU test has variability of ±10% from the mean, for a given sample between tests run at different times or places. As a result, only gross comparisons can be made between test results run at different times, while more specific comparisons can be made for a series of tests run at about the same time.

Examples 1–6 were one series of tests and show the heat release improvement from addition of zinc borate. These Examples used a 65/35 blend of PS/PK, and Examples 1–3 had much lower heat release than the neat polymers, see Comparative Examples 5 and 6. Examples 1–3 also show only slight heat release improvement and show lower impact strength with increased zinc borate content. Examples 4–6 show improvement over Examples 1–3, respectively, from addition of the fluorocarbon polymer. Comparing Example 2 to Example 3 and Example 5 to Example 6 shows that increase of the zinc borate concentration above 8 parts per 100 parts of the polysulfone/polyketone resulted in no heat release improvement.

Examples 7–10 and Comparative Example 1 were a second series of tests of the 65/35 PS/PK blend. Comparing Example 7 and Comparative Example 1, zinc borate and PTFE are essentially equivalent in effectiveness for heat release improvement. In Examples 8 and 9, slight improvements from use of the two additives together were obtained relative to Example 7 and Comparative Example 1. Example 10 shows no heat release improvement, other than a diluent effect, from addition of TiO₂.

Examples 11–13 and Comparative Example 2 were a third series. Example 11, using PTFE and zinc borate shows significant improvement over use of PTFE alone as a heat release retardant. Example 12 showed little improvement with higher zinc borate content. Example 13, similarly to Example 10, had little improvement from addition of TiO₂.

Examples 14 and 15 were run to examine PTFE amount effect and show essentially equivalent heat release results for each level of PTFE. However, processing was better in Example 15.

Examples 16–18 and Comparative Example 3 were all of a 65/35 blend. Here Comparative Example 3 is a composition disclosed in the commonly assigned co-pending application Ser. No. 07/504,779. Little difference in heat release levels is seen for Examples 16–18 from the Comparative Example 3.

Examples 19A, 19B and 19C are of 65/35 blends in different test specimen thicknesses. The heat release effect of zinc borate is seen at all three thickness levels.

Examples 20–22 and Comparative Example 4 were another series of tests, but of a 75/25 PS/PK blend. Example 22 shows the significant improvement from zinc borate alone. The Comparative Example 4 showed some improvement from TiO₂ alone. Example 20 showed no heat release improvement other than a diluent effect from addition of TiO₂ compared to Example 22. The 75/25 blends of the invention showed lower impact than the 65/35 blends of the invention.

The above results illustrate the effectiveness of zinc borate in the compositions of the invention on achieving heat release improvement.

EXAMPLES 23-31 AND COMPARATIVE EXAMPLES 7-12

Examples 23-31 and Comparative Examples 7-12 relate to compositions of the invention comprising a poly (biphenyl ether sulfone) with various additives. Examples 23-29 and Comparative Examples 7-11 all used 100 parts by weight PS with the amount of additive listed in TABLE 2. Example 27 added 2 parts by weight per 100 parts by weight of PS of brominated polyphenylene oxide, a conventional flame retardant. TABLE 2 lists test details and results.

TABLE 2

|  | F5A | ZnB | TiO2 | Impact | Av. Max Heat Release. |
|---|---|---|---|---|---|
| Ex. | | | | | |
| 23 | 0 | 4 | 0 | 101 | 69 |
| 24 | 0 | 8 | 0 | 91.2 | 84.2 |
| 25 | 0 | 15 | 0 | 104.4 | 74 |
| 26 | 2 | 6 | 0 | 104 | 41 |
| 27 | 0 | 6 | 0 | 112 | 54 |
| 28 | 2 | 6 | 2.5 | — | 37.4 |
| 29 | 1 | 4 | 0 | 105.6 | 35.6 |
| 30 | 2 | 6 | 0 | 116 | 48.8 |
| 31 | 2 | 6 | 0 | — | 52 |
| Comp. Ex. | | | | | |
| 7 | 5 | 0 | 0 | 117.6 | 56.2 |
| 8 | 2 | 0 | 0 | >160 | 58.2 |
| 9 | 2 | 0 | 4 | >160 | 54.3 |
| 10 | 0 | 0 | 10 | 117 | 70.2 |
| 11 | 0 | 0 | 4 | 155 | 65.6 |
| 12 | 0 | 0 | 0 | >160 | 97.9 |

Examples 23-25 compared to Comparative Example 12 show the heat release improvement from addition of zinc borate to a biphenyl poly(aryl ether sulfone). In contrast to the composition of Examples 1-22, the heat release improvement in Examples 23-25 was not as large. There was no trend of improvement with higher zinc borate content in Examples 23-25.

Examples 26-29 and comparative Examples 7 and 9 were run as one series. Similar to the results above, addition of PTFE and zinc borate gave better heat release improvement than use of either alone, and adding TiO2 had little effect. Example 27 with brominated polyphenylene oxide and zinc borate was not as effective as Examples 26, 28, or 29 with PTFE and zinc borate.

Reviewing the results of Examples 23-29 in PS and those of 1-22 in PS/PK blends, the effect of using both PTFE and zinc borate is synergistic and much greater in a biphenyl poly(aryl ether sulfone) than in a blend of such a sulfone and a polyketone.

EXAMPLES 32-33 AND COMPARATIVE EXAMPLES 13-15

Examples 32-33 and Comparative Examples 13-15 relate to blends of the invention comprising a poly(biphenyl ether sulfone) and a poly(aryl ether sulfone). Each of Examples 32-33 and Comparative Examples 13-15 used 70 parts by weight PS and 30 parts by weight PAES per 100 parts combined weight PS/PAES. The PAES used, however, was RADEL-®A-200, which differs from RADEL ®A-300 in that it has a reduced viscosity of 0.46-0.50 dl/g as measured in N-methyl pyrrolidone at a concentration of 0.2 g/dl at 25° C. TABLE 3 lists the test details.

TABLE 3

|  | F5A | ZnB | TiO2 | Impact | Av. Max Heat Release. |
|---|---|---|---|---|---|
| Ex. | | | | | |
| 32 | 2 | 4 | 0 | 132 | 53.3 |
| 33 | 2 | 6 | 0 | 119.2 | 39.0 |
| Comp. Ex. | | | | | |
| 13 | 2 | 0 | 4 | 147.6 | 50.7 |
| 14 | 2 | 0 | 0 | 166.1 | 68 |
| 15 | 0 | 0 | 4 | 130.7 | 67.3 |

As is seen in Examples 32 and 33, use of zinc borate and PTFE is essentially equivalent to, and is more effective at higher zinc borate content, in heat release improvement than PTFE or PTFE/TiO2 in blends of a poly(biphenyl ether sulfone) with a poly(aryl ether sulfone).

EXAMPLES 34-35 AND COMPARATIVE EXAMPLE 16

Examples 34 and 35 and Comparative Example 16 relate to compositions of the invention comprising a poly(biphenyl ether sulfone), zinc borate and glass fibers. All were run using a high viscosity PS having a melt flow of 9-17 g./10 min. CS measured at 380° C. The glass fibers used were 1/8 inch chopped strand, available as 497 EE from Owens Corning. Table 4 lists test details and results, with all additive amounts in parts by weight per 100 parts by weight PS.

TABLE 4

|  | F5A | ZnB | Glass Fiber | Impact | Heat Release |
|---|---|---|---|---|---|
| Ex. | | | | | |
| 34 | 1 | 4 | 5 | 143.2 | 45.7 |
| 35 | 1 | 4 | 10 | 110.4 | 41.3 |
| Comp.Ex. | | | | | |
| 16 | 0 | 0 | 10 | 124.0 | 75.3 |

Comparative Example 16 showed that addition of glass fiber to PS resulted in heat release improvement, as was expected. However, Applicants anticipated that addition of the glass fiber would lower the impact strength of PS significantly. This did not occur. Examples 34 and 35 further surprised Applicants in that addition of glass fiber and zinc borate and a minimum amount of PTFE for processing enhancement resulted in significant heat release improvement while retaining good impact strength.

The above is not to be considered as limiting; the scope of the invention is set out by the following claims.

We claim:

1. A thermoplastic composition comprising:
    a) a polyarylether comprising at least one poly(biphenyl ether sulfone)
    b) at least 2.0 parts by weight of anhydrous zinc borate per 100 parts by weight of polyarylether; and
    c) about 1.0 to about 8.0 parts weight of nonfibrillating fluorocarbon polymer per 100 parts by weight of polyarylether.

2. The composition of claim 1 wherein said polyarylether comprises a poly(aryl ether ketone).

3. The composition of claim 1 wherein said polyarylether comprises a poly(aryl ether sulfone).

4. The composition of claim 1 comprising about 2.0 to about 8.0 parts by weight zinc borate per 100 parts by weight polyarylether.

5. The composition of claim 1 zinc borate has a water content of less than about 0.2 weight percent.

6. The composition of claim 1 comprising about 1.0 to about 8.0 parts of the fluorocarbon polymer and about 3.0 to about 12.0 parts of titanium dioxide, per 100 parts by weight polyarylether.

7. The composition of claim 6 wherein the fluorocarbon polymer has a molecular weight of less than about 100,000.

8. The composition of claim 6 wherein the fluorocarbon polymer is polytetrafluoroethylene.

9. The composition of claim 1 wherein the poly(biphenyl ether sulfone) comprises repeating units of the formula

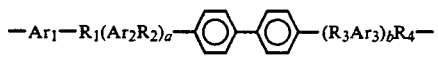

wherein $R_1$ through $R_4$, are —O—, —SO$_2$—, —S—, C=O, with the proviso that at least one of $R_1$ through $R_4$ is —O— and at leaSt One of $R_1$ through $R_4$ is —SO$_2$—; Ar$_1$, Ar$_2$ and Ar$_3$ are arylene radicals containing 6 to 24 carbon atoms, and are preferably phenylene or biphenylene; and a and b are either or 1.

10. The composition of claim 9 wherein said polyaryl ether comprises about 20 parts to about 60.0 parts by weight of a poly(aryl ether ketone) and about 50 0 parts to about 80.0 parts poly(biphenyl ether sulfone) per 100 parts by weight polyarylether.

11. The composition of claim 11, wherein the poly(aryl ether ketone) comprises a repeating unit of at least one of the following units:

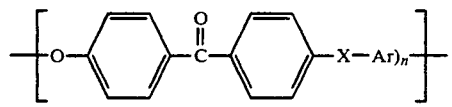

[I]

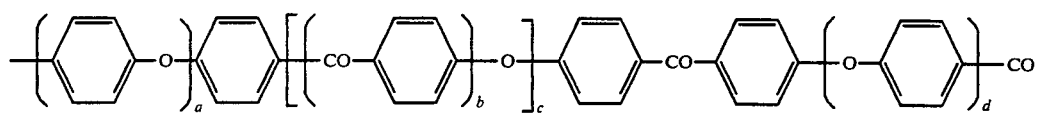

[II]

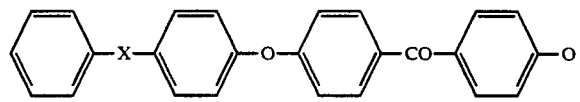

[III]

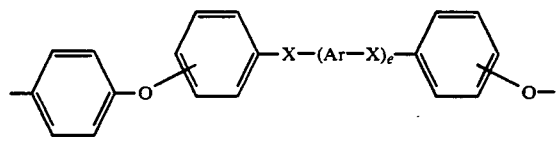

[IV]

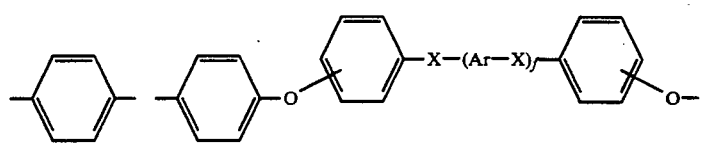

[V]

wherein Ar is independently a divalent aromatic radical selected from phenylene, biphenylene or naphthylene; X is independently O, C=O, or a direct bond; m is an integer of 0 to 3; b, c, d, and e are 0 or 1, and preferably d is 0 when B is 1; and f is an integer of 1 to 4.

12. The composition of claim 9 wherein said polyarylether comprises 0.0 parts to about 50.0 parts by weight of a poly(arylether sulfone) and about 50.0 parts to 100.0 parts by weight of the poly(biphenyl ether sulfone), per 100 parts by weight of the polyaryl,ether.

13. The composition of claim 12 wherein the poly(aryl ether sulfone) comprises units of the formula

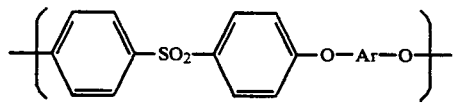

wherein Ar$_1$ is a phenylene moiety, other than biphenyl.

14. polyarylether composition having improved heat release characteristics comprising:
(a) a poly(biphenyl ether sulfone) having the repeating unit

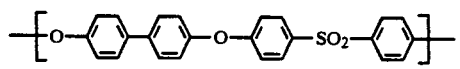

(b) about 2.0 to about 8.0 parts by weight anhydrous zinc borate per 100 parts by weight of the poly(biphenyl ether sulfone);
(c) about 1.0 parts to about 8.0 parts by weight per 100 parts by weight of the poly(biphenyl ether sulfone) of a non-fibrillating fluorocarbon polymer; and
(d) about 3.0 parts to about 12.0 parts by weight per 100 parts by weight of the poly(biphenyl ether sulfone) of titanium dioxide.

15. A polyarylether composition having improved heat release characteristics comprising:

(a) about 50.0 parts to about 80.0 parts by weight of poly(biphenyl ether sulfone) having the repeating unit

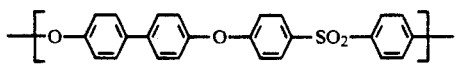

(b) about 20.0 parts to about 50.0 parts by weight of a poly(aryl ether ketone) having at least one repeating unit of the following formula

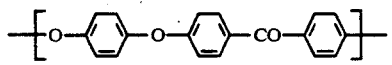

wherein the amounts of the poly(biphenyl ether sulfone) and the poly(aryl ether ketone) are per 100 parts weight of the poly(biphenyl ether sulfone) and the poly(aryl ether ketone);
(c) about 2.0 parts to about 8.0 parts by weight anhydrous zinc borate per 100 parts combined weight of the poly(biphenyl ether sulfone) and the poly(aryl ether ketone);
(d) about 1.0 part to about 8.0 parts by weight per 100 parts combined weight of the poly(biphenyl ether sulfone) and the poly(aryl ether ketone) of a non-fibrillating fluorocarbon polymer; and
(e) about 3.0 parts to about 12.0 parts by weight of titanium dioxide per 100 parts combined weight of the poly(biphenyl ether sulfone) and the poly(aryl ether ketone).

16. A polyarylether composition having improved heat release characteristics comprising:
(a) about 50.0 parts to about 90.0 parts by weight of a poly(biphenyl ether sulfones) having the repeating unit

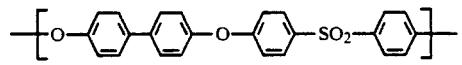

(b) about 10.0 to about 50.0 parts by weight of a poly(aryl ether sulfone) comprising repeating units of the formula

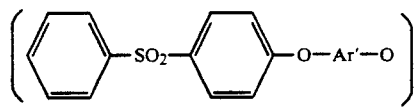

wherein at least about 50 mole percent of the Ar' groups are bisphenyl S moieties and the remainder of the Ar' groups are p-phenylene, and wherein the amounts of the poly(biphenyl ether sulfone) and the poly(aryl ether sulfone) are per 100 parts combined weight of the poly(biphenyl ether sulfone) and the poly(aryl ether sulfone);
(c) about 2.0 parts to about 8.0 parts by weight anhydrous zinc borate, per 100 parts combined weight of the poly(biphenyl ether sulfone) and the poly(aryl ether sulfone);
(d) about 1.0 parts to about 8.0 parts by weight per 100 parts combined weight of the poly(biphenyl ether sulfone) and the poly(aryl ether sulfone) of a non-fibrillating fluorocarbon polymer; and
(e) about 3.0 parts to about 12.0 parts by weight per 100 parts combined weight of the poly(biphenyl ether sulfone) and the poly(aryl ether sulfone) of titanium dioxide.

17. The composition of claim 14 wherein the fluorocarbon polymer is polytetrafluoroethylene.
18. The composition of claim 15 wherein the fluorocarbon polymer is polytetrafluoroethylene.
19. The composition of claim 18 wherein the fluorocarbon polymer is polytetrafluoroethylene.
20. The thermoplastic composition of claim 1 having a two minute total heat release of less than about 65.0 kilowatts minute per square meter of surface are and a maximum heat release rate for the first five minutes of less than about 65.0 kilowatts per square meter of surface area, as measured by the Ohio State University heat calorimetry test described in 14 Code of Federal Regulations, Part 25-Airworthiness Standards-Transport Category Airplanes.
21. A polyarylether composition having improved heat release characteristics comprising:
(a) a poly(biphenyl ether sulfone);
(b) glass fibers;
(c) anhydrous zinc borate; and
(d) a non-fibrillating fluorocarbon polymer.
22. The composition of claim 21 comprising at least about 5.0 parts by weight glass fiber per 100 parts by weight poly(biphenyl ether sulfone).
23. The composition of claim 21 wherein the poly(biphenyl ether sulfone) comprises a repeating unit of the formula:

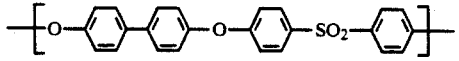

24. The composition of claim 21 wherein the fluorocarbon polymer comprises polytetrafluoroethylene.
25. The composition of claim 1 further comprising glass fibers.

* * * * *

UNITED STATES PATENT AND TRADEMARK OFFICE
CERTIFICATE OF CORRECTION

PATENT NO. : 5,204,400
DATED : April 20, 1993
INVENTOR(S) : W.E. Kelly, et al.

It is certified that error appears in the above-indentified patent and that said Letters Patent is hereby corrected as shown below:

| Col. | Line | |
|---|---|---|
| 22 | 67 | "zinc borate per 100 parts" should read --zinc borate and about 1.0 to about fluorocarbon polymer per 100 parts." |
| 23 | 25 | "either or 1" should read --either 0 or 1--. |
| 23 | 28 | 'about 50..0 parts" should read --about 50.0 parts--. |
| 26 | 26 | "surfaces are" should read --surface area--. |

Signed and Sealed this

Fifth Day of April, 1994

Attest:

BRUCE LEHMAN

*Attesting Officer*      *Commissioner of Patents and Trademarks*